United States Patent
Lamers (10) Patent No.: US 11,612,835 B2
(45) Date of Patent: Mar. 28, 2023

(54) SEPARATOR FOR SEPARATING GAS AND/OR PARTICLES FROM A LIQUID

(71) Applicant: Spiro Enterprises B.V., Sint Anthonis (NL)

(72) Inventor: Antonius Gerardus Wilhelmus Maria Lamers, Asten (NL)

(73) Assignee: SPIRO ENIERPRISES B.V., Sint Anthonis (NL)

( * ) Notice: Subject to any disclaimer, the term of this patent is extended or adjusted under 35 U.S.C. 154(b) by 220 days.

(21) Appl. No.: 16/628,133

(22) PCT Filed: Jul. 3, 2018

(86) PCT No.: PCT/NL2018/050424
§ 371 (c)(1),
(2) Date: Jan. 2, 2020

(87) PCT Pub. No.: WO2019/009705
PCT Pub. Date: Jan. 10, 2019

(65) Prior Publication Data
US 2020/0122059 A1    Apr. 23, 2020

(30) Foreign Application Priority Data
Jul. 3, 2017 (NL) .................................... 2019164

(51) Int. Cl.
*B01D 19/00* (2006.01)
*B01D 21/00* (2006.01)
*F25B 43/00* (2006.01)

(52) U.S. Cl.
CPC ..... *B01D 19/0042* (2013.01); *B01D 21/0042* (2013.01); *B01D 21/0087* (2013.01); *F25B 43/00* (2013.01); *F25B 2400/23* (2013.01)

(58) Field of Classification Search
CPC ................ B01D 19/00; B01D 19/0042; B01D 21/0042; B01D 21/0087; F25B 43/00; F25B 2400/23
See application file for complete search history.

(56) References Cited

U.S. PATENT DOCUMENTS 3,175,342 A * 3/1965 Balogh ................. F25B 43/003
                                                    55/513
3,355,021 A * 11/1967 Jones .................... F25B 43/003
                                                    210/446
(Continued)

FOREIGN PATENT DOCUMENTS

| DE | 19905378 C1 | 8/2000 | |
| EP | 1028299 A2 * | 8/2000 | ........... B01D 53/261 |
| GB | 1579516 A | 11/1980 | |

OTHER PUBLICATIONS

EP 1028299A2_English Translation (Year: 1999).*
Oct. 24, 2018, International Search Report and Written Opinion, PCT/NL2018/050424.

*Primary Examiner* — Youngsul Jeong
(74) *Attorney, Agent, or Firm* — Banner & Witcoff, Ltd.

(57) ABSTRACT

The invention relates to separator for separating gas bubbles and/or particles from a liquid. The separator comprises a collection chamber, a fluid inlet, a fluid outlet, and a first fluid flow path extending from the fluid inlet through the collection chamber to the fluid outlet. The separator includes at least one separating element arranged for separating gas bubbles from the liquid arranged in the first fluid flow path. The separator further includes at least one plate arranged in the collection chamber such that the plate defines a passage forming a second fluid flow path at least partially bypassing the separating element.

14 Claims, 4 Drawing Sheets

(56) References Cited

U.S. PATENT DOCUMENTS

| | | | |
|---|---|---|---|
| 3,854,906 A | 12/1974 | Roffelsen | |
| 4,027,691 A | 6/1977 | Roffelsen | |
| 4,381,928 A | 5/1983 | Roffelsen | |
| 4,655,282 A | 4/1987 | Roffelsen | |
| 6,235,192 B1 * | 5/2001 | Melfi | B01D 53/0431 |
| | | | 210/287 |

* cited by examiner

SEPARATOR FOR SEPARATING GAS AND/OR PARTICLES FROM A LIQUID

CROSS-REFERENCE TO RELATED APPLICATIONS

This application is a U.S. National Stage application under 35 U.S.C. § 371 of International Application PCT/NL2018/050424 (published as WO 2019/009705 A1), filed Jul. 3, 2018, which claims the benefit of priority to Application NL 2019164, filed Jul. 3, 2017. Benefit of the filing date of these prior applications is hereby claimed. Each of these prior applications is hereby incorporated by reference in its entirety.

FIELD OF THE INVENTION

The invention relates to a separator for separating gas bubbles and/or particles from a liquid, especially a heating and/or cooling liquid, such as in a heating and/or cooling system. The invention also relates to a heating and/or cooling system.

BACKGROUND TO THE INVENTION

Separators for separating gas and/or particles, such as debris, from a liquid, such as a heating and/or cooling liquid, are known. A known type of separator includes a collection chamber, a fluid inlet, a fluid outlet, and a first fluid flow path extending from the fluid inlet through the collection chamber to the fluid outlet.

A known type of separator is a micro-bubble degassing device. Such micro-bubble degassing device includes a separating element within the collection chamber. The separating element functions to generate, grow and separate bubbles. The bubbles then migrate towards a head portion of the degassing device. This type of degassing device has been found to be very effective in removing dissolved gas from heating liquid in a closed circuit.

For effectively separating gas and/or particles from the liquid, the volume of the collection chamber may need to be relatively large. It may be desired to provide separators with a smaller form factor. Also, it is believed that the efficiency of the known separator can be increased at the same or decreased size of the separator.

SUMMARY OF THE INVENTION

It is an object to provide a system and a method that obviates at least one of the above mentioned drawbacks.

It is alternatively, or additionally, an object to provide an improved separator.

It is alternatively, or additionally, an object to provide an alternative separator.

Thereto, according to an aspect is provided a separator for separating gas bubbles and/or particles from a liquid. The liquid can be a heating and/or cooling liquid, such as in a heating and/or cooling system. The separator comprises a collection chamber, a fluid inlet, and a fluid outlet. A first fluid flow path extends from the fluid inlet through the collection chamber to the fluid outlet. The separator includes at least one separating element arranged for separating gas bubbles and/or particles from the liquid. The at least one separating element is arranged in the first fluid flow path. The separator further includes at least one plate arranged in the collection chamber such that the plate defines a passage forming a second fluid flow path at least partially bypassing the at least one separating element.

The separating element is arranged for promoting growth of gas bubbles. Hence, the separator including the separating element can be arranged as a micro-bubble separator. The at least one separating element can include a plurality of bodies. Such bodies may include spheres, wires or the like. The separating element can include a core tube and a wire structure attached to the core tube. The separating element may e.g. include a spiraling wire. Such separating element may e.g. include a so-called spirotube. The spirotube comprises a core tube, surrounded by a coil of wire. The construction of such spirotube is generally as described in patent documents GB 1,579,516, U.S. Pat. Nos. 4,655,282, 3,854,906, 4,027,691 or U.S. Pat. No. 4,381,928 and reference can be had to these documents for further details.

Optionally, the separating element is positioned between the fluid inlet and fluid outlet.

The first fluid flow path can be the main fluid flow path. The main fluid flow path can carry more than half of the volume flow through the collection chamber, e.g. more than 70%.

The separating element being arranged in the first fluid flow path provides the advantage that in the liquid flowing from the fluid inlet to the fluid outlet via the first fluid flow path bubbles are generated and/or allowed to rise. The separating element may also affect the flow in the first fluid flow path such that particles, such as debris, are allowed to sink, and e.g. deposit.

The at least one plate is arranged in the collection chamber such that the plate defines a passage forming a second fluid flow path at least partially bypassing the separating element. The second fluid flow path may e.g. completely bypass the separating element. However, it has been found that a portion of the liquid traversing the separator at least partially bypassing the separating element can increase the efficiency of the separator. Without being bound to any theory, it is believed that the second fluid flow path, e.g. the at least one plate and/or an inner wall of the collection chamber bounding the second fluid flow path, relaxes the flow, aligns the flow and/or reduces turbulence, allowing gas and/or particles to be separated in the second fluid flow path.

Optionally, a flow resistance of the second fluid flow path is higher than a flow resistance of the first fluid flow path. Hence it is automatically provided that a volume flow of the liquid via the first fluid flow path is larger than a volume flow of the liquid via the second fluid flow path.

Optionally, the at least one plate extends substantially parallel to the first fluid flow path. Hence, the second fluid flow path can extend substantially parallel to the fluid flow path. This may allow to provide a relatively small form factor to the separator. Optionally, the at least one plate extends substantially parallel to a direction extending from the fluid inlet to the fluid outlet.

Optionally, the at least one plate is positioned below, such as underneath, the first fluid flow path for the separator arranged to separate particles from the liquid flow. Optionally, the at least one plate is positioned above, such as over, the first fluid flow path for the separator arranged to separate gas from the liquid flow. Optionally, at least one plate is positioned above, such as over, the first fluid flow path and at least one plate is positioned below, such as underneath, the first fluid flow path for the separator arranged to separate gas and particles from the liquid flow. In this way, the at least one plate is positioned on the side of the first fluid flow path where the product to be separated, i.e. gas and/or particles, is to be transported to. This can improve separating efficiency for the product to be separated from the liquid.

Optionally, the at least one plate is positioned below, such as underneath, the separating element for the separator arranged to separate particles from the liquid flow. Optionally, the at least one plate is positioned above, such as over, the separating element for the separator arranged to separate gas from the liquid flow. Optionally, at least one plate is positioned above, such as over, the separating element and at least one plate is positioned below, such as underneath, the separating element for the separator arranged to separate gas and particles from the liquid flow.

Optionally, the fluid inlet is situated opposite to the fluid outlet. In an example, the fluid outlet is situated across the fluid inlet.

Optionally, the at least one plate has shape a complementary to an inner wall of the collection chamber at the location of the at least one plate. There may be a gap between, at least a portion of, the perimeter of the plate and the inner wall. The gap may e.g. between 1 and 10 mm wide, for example between 2 and 5 mm wide. The gap may function as entrance and/or exit of the second fluid flow path.

Optionally, the at least one plate includes a first cutout and/or opening forming the entrance of the second fluid flow path, and a second cutout and/or opening forming the exit of the second fluid flow path.

Optionally, the at least one plate is arranged in a lying position. Optionally, the at least one plate is arranged substantially horizontally in the collection chamber. In a lying or recumbent position, the at least one plate may be substantially parallel to the direction extending from the fluid inlet to the fluid outlet and/or the first flow path direction. In an example, the at least one plate is in a horizontal or flat position.

Optionally, the at least one plate is arranged in a tilted position. The tilt angle, of e.g. 1 to 20 degrees, may allow for gas bubbles to rise and/or particles to sink e g via the gap between the plate and the inner wall of the collection chamber. Optionally, the at least one plate comprises at least one non-flat portion. Optionally, the at least one plate comprises a downward inclined portion. Optionally, the at least one plate comprises an upward inclined portion. The non-flat portion, downward inclined portion and/or upward inclined portion may likewise assist in gas bubbles and/or particles to be removed from the second fluid flow path. Optionally, the at least one plate includes a hole, e.g. in or near a center of the at least one plate, for allowing bubbles and/or particles to be removed from the second fluid flow path.

Optionally, a plurality of plates are arranged in the collection chamber such that the each plate defines a passage forming a second fluid flow path at least partially bypassing the separating element. Hence, multiple second fluid flow paths may be formed, further increasing the efficiency of the separator. A second fluid flow path may be formed between one of the plates and the inner wall, e.g. bottom, of the collection chamber. A second fluid flow path may be formed between two adjacent plates. Optionally, the plurality of plates are arranged mutually parallel.

Optionally, a length of the second fluid flow path along the at least one plate is longer than a thickness of the second fluid flow path. The thickness of the second fluid flow path can be defined by the distance between the at least one plate and the inner wall, e.g. bottom, of the collection chamber. The thickness of the second fluid flow path can be defined by the distance between two adjacent plates. The length of the second fluid flow path along the at least one plate is preferably more than ten times the thickness of the second fluid flow path at the at least one plate. A high length/thickness ratio allows bubbles to rise to the plate at the top of the second fluid flow path and/or particles to sink to the plate at the bottom of the fluid flow path. At the plate the bubbles can coagulate, attach to the plate and/or be slowed down. At the plate particles can coagulate, attach to the plate and/or be slowed down.

Optionally, the at least one plate is located at a distance from the fluid inlet and/or fluid outlet. Optionally, the at least one plate is arranged below the fluid inlet and/or fluid outlet. Optionally, the at least one plate is arranged above the fluid inlet and/or fluid outlet.

Optionally, a first plate is positioned at or above an upper side of the fluid inlet and/or the fluid outlet, and a second plate is positioned at or below the fluid inlet and/or the fluid outlet. The at least one separating element is positioned, at least partially, between the first plate and the second plate.

Optionally, the at least one separating element extends through an opening formed in at least one plate, e.g. an opening formed in first plate and/or the second plate.

Optionally, a magnetizable element is arranged inside the collection chamber. Optionally, the magnetizable element is removably arranged in the collection chamber. Optionally, one or more plates of the at least one plate are shaped to surround the magnetizable element. Optionally, one or more plates of the at least one plate have a cutout through which the magnetizable element can extend.

According to an aspect is provided a heating and/or cooling system including a liquid flow circuit. The liquid flow circuit can be a closed liquid flow circuit. The liquid flow circuit includes a pump and a separator. The separator can be as described herein. In use the pump can cause a pressure difference across the separator, such that a liquid pressure at the fluid inlet is higher than at the fluid outlet. The at least one plate arranged in the collection chamber has an upstream end towards the fluid inlet and a downstream end towards the fluid outlet. The liquid can be a heating and/or cooling liquid, such as water. Optionally, the plate is positioned such that in use a liquid pressure at the upstream end is higher than the liquid pressure at the downstream end. The pressure difference at the upstream and downstream ends of the plate can be in the range of 0.01 to 0.3 bar, preferably 0.01 to 0.1 bar.

According to an aspect is provided a method for separating gas bubbles and/or particles from a liquid by means of a separator. The separator can be as described herein. The method comprising the steps of feeding a liquid flow to the fluid inlet, and draining the liquid from the fluid outlet. The method may include draining particles from the separator, e.g. via a drain port of the separator. The draining of particles may include flushing the separator, e.g. with a liquid, such as the heating and/or cooling liquid. The method may include draining gas from the separator, e.g. via a vent of the separator. The vent may e.g. be an automatic vent, e.g. including a rise pipe and/or float operated valve.

It will be appreciated that any of the aspects, features and options described in view of the separator apply equally to the system and method, and vice versa. It will also be clear that any one or more of the above aspects, features and options can be combined.

BRIEF DESCRIPTION OF THE DRAWING

The invention will further be elucidated on the basis of exemplary embodiments which are represented in a drawing. The exemplary embodiments are given by way of non-limitative illustration. It is noted that the figures are only schematic representations of embodiments of the invention that are given by way of non-limiting example.

In the drawing.

DETAILED DESCRIPTION

Figure 1:
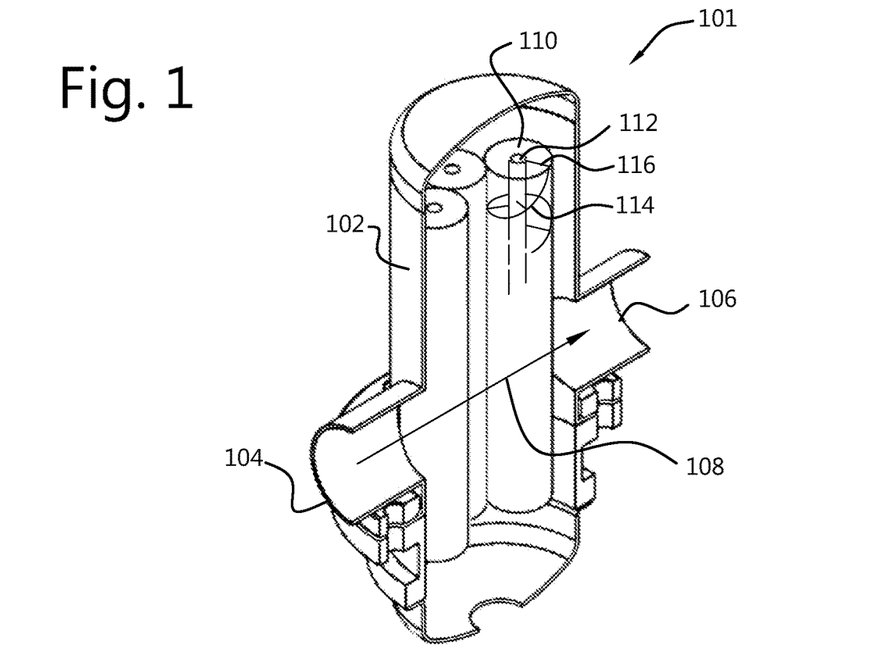
FIG. 1 shows an example of a cross section of a separator.

FIG. 1 shows an example of a cross section of a separator 101 for separating gas bubbles and/or particles from a liquid. The separator 101 includes a collection chamber 102. In this example, the collection chamber has a substantially upright tubular shape. The separator 101 includes a fluid inlet 104 and a fluid outlet 106. A first fluid flow path 108 extends from the fluid inlet 104 through the collection chamber 102 to the fluid outlet 106. In this example, the separator 101 includes a plurality of separating elements 110. Here the separator 101 includes six separating elements, although only three separating elements 110 are shown in the cross sectional view. The separating elements 110 are arranged in the first fluid flow path 108. The separating elements 110 are arranged for separating gas bubbles and particles from liquid flowing along the first fluid flow path. In this example, the separating elements 110 are arranged as so-called spiro-tubes. The spirotube includes a core tube 112. The core tube 112 is surrounded by a coil 114 of wire. The coil 114 of wire is maintained at a distance from the core tube 112 with spokes 116. The construction of such spirotube is generally as described in patent documents GB 1,579,516, U.S. Pat. Nos. 4,655,282, 3,854,906, 4,027,691 or U.S. Pat. No. 4,381,928 and reference can be had to these documents for further details. It will, however, be appreciated that the separating elements 110 could also be designed differently. The separating elements 110 could e.g. include a plurality of bodies, such as spheres, wires, meshes, cubes, grit, or the like.

It is noted that the separator 101 of FIG. 1 serves as a comparative example as will be described below.

Figure 2:
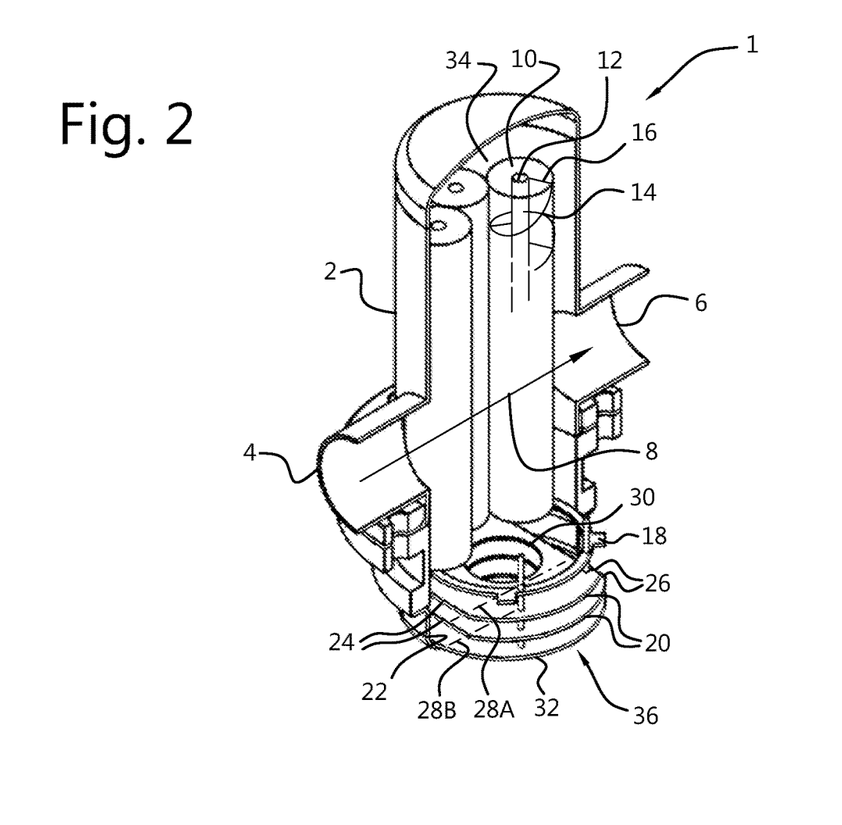
FIG. 2 shows an example of a cross section of a separator.

FIG. 2 shows an example of a cross section of a separator 1 for separating gas bubbles and/or particles from a liquid. The separator 1 includes a collection chamber 2. In this example, the collection chamber has a substantially upright tubular shape. The separator 1 includes a fluid inlet 4 and a fluid outlet 6. A first fluid flow path 8 extends from the fluid inlet 4 through the collection chamber 2 to the fluid outlet 6. In this example, the separator 1 includes a plurality of separating elements 10. Here the separator 1 includes six separating elements, although only three separating elements 10 are shown in the cross sectional view. The separating elements 10 are arranged in the first fluid flow path 8. The separating elements 10 are arranged for separating gas bubbles and particles from liquid flowing along the first fluid flow path. In this example, the separating elements 10 are arranged as so-called spiro-tubes. The spirotube includes a core tube 12. The core tube 12 is surrounded by a coil 14 of wire. The coil 14 of wire is maintained at a distance from the core tube 12 with spokes 16. The core tube, coil 14 and spokes 16 are only partially shown in FIG. 2. It will, however, be appreciated that the separating elements 10 could also be designed differently. The separating elements 10 could e.g. include a plurality of bodies, such as spheres, wires, meshes, cubes, grit, or the like. The separating elements 10 in this example are placed on a carrier 18.

In the example of FIG. 2, the separator 1 includes two plates 20. The plates 20 are arranged in the collection chamber 2. The plates 20 are positioned underneath the separating elements 10. Here the plates 20 are positioned at a vertical distance from the fluid inlet 4 and fluid outlet G. The plates 20 here are substantially parallel with respect to each other. The plates are positioned substantially horizontally. The plates 20 have a shape and size that is complementary to the shape and size of the inner wall 22 of the collection chamber 2 at the location of the plates 20.

The plates 20 include a first cutout 24 and a second cutout 26. The first cutout 24 forms the entrance of a second fluid flow path 28A, 28B, The second cutout 26 forms the exit of the second fluid flow path 28A, 28B. Hence, the plates 20 define a passages forming second fluid flow paths 28A, 28B at least partially bypassing the separating elements 10. In this example a gap between the perimeter of the plates 20 and the inner wall 22 of the collection chamber, except at the locations of the cutouts 24, 26, is chosen to be so small as to allow easy mechanical insertion of the plates 20 into the chamber 2, but hardly allow any flow of liquid through the gap. In this example the gap is chosen to be equal to or less than 1 mm wide.

In the example of FIG. 2, the plates 20 further include a hole 30 in a center of the plate.

In the example of FIG. 2, the separator 1 further includes an internal bottom 32. The internal bottom here serves for mounting the plates 20 and carrier ring 18 thereto. The internal bottom 32 does not include cutouts. Therefore, there is no passage forming a second fluid flow path underneath the internal bottom 32.

In this example, a length of the second fluid flow paths 28A, 28B along the plates 20, i.e. here a length from the first cutout edge to the second cutout edge, is longer than the distance between the plates, and the distance between the lower plate 20 and the internal bottom 32. Here the length of the second fluid flow path is approximately eight times the distance between the plates, and the distance between the lower plate 20 and the internal bottom 32.

The separator as described in view of FIG. 2 can be operated as follows. A flow of liquid is fed into the fluid inlet 4. A first portion of the liquid flow will flow along the first fluid flow path 8 towards the fluid outlet 6. Along the first fluid flow path, the liquid encounters the separating elements 10. The presence of the objects formed by the separating elements aids in generating and rising if gas micro-bubbles. The separating elements 10 cause a local smooting of the liquid flow without offering any substantial flow resistance. This too aids in separating gas from the liquid, as well as in separating particles from the liquid. The gas bubbles will rise towards the head 34 of the separator 1. The particles will sink towards the bottom 36 of the separator 1.

A second portion of the liquid flow will flow from the fluid inlet 4 downwards along the inner wall 22 of the chamber 2 towards the first cutouts 24. There, the second portion of the liquid will be divided over the two second flow paths 28A, 28B, and flows along the plates 20. It will be appreciated that the second portion of the liquid flow bypasses at least a portion of the separating elements 10. The second fluid flow paths 28A, 28B pacify the flow of liquid therethrough. This aids in generating gas bubbles and separating particles from the liquid flow. The gas bubbles will rise towards the head 34, via the hole(s) 30. The particles will sink towards the bottom 36 via the hole(s) 30 and a hole 38 in the internal bottom 32 (obscured by the plates 20 in FIG. 2).

In this example, a flow resistance of the second fluid flow path is higher than a flow resistance of the first fluid flow path. Hence, in this example the second portion of the liquid flow is smaller than the first portion of the liquid flow.

Once an amount of particles has been collected, e.g. after a predetermined period of time, a drain 40, e.g. a valve, in the bottom 36 of the separator 1 may be opened for draining the particles from the separator. Optionally, the separator is flushed, e.g. using the liquid, for flushing particles remaining at the plates 20 and/or internal bottom 32, through the drain.

Once an amount of gas has been collected, e.g. after a predetermined period of time, a vent 65, e.g. a valve, in the head 34 of the separator 1 may be opened for venting the gas from the separator. Optionally, the vent 65 includes an automatically operated valve, such as a float operated valve. The float operated valve can e.g. be as described in patent documents U.S. Pat. Nos. 3,854,906, 4,027,691 or U.S. Pat. No. 4,381,928.

Figure 3:
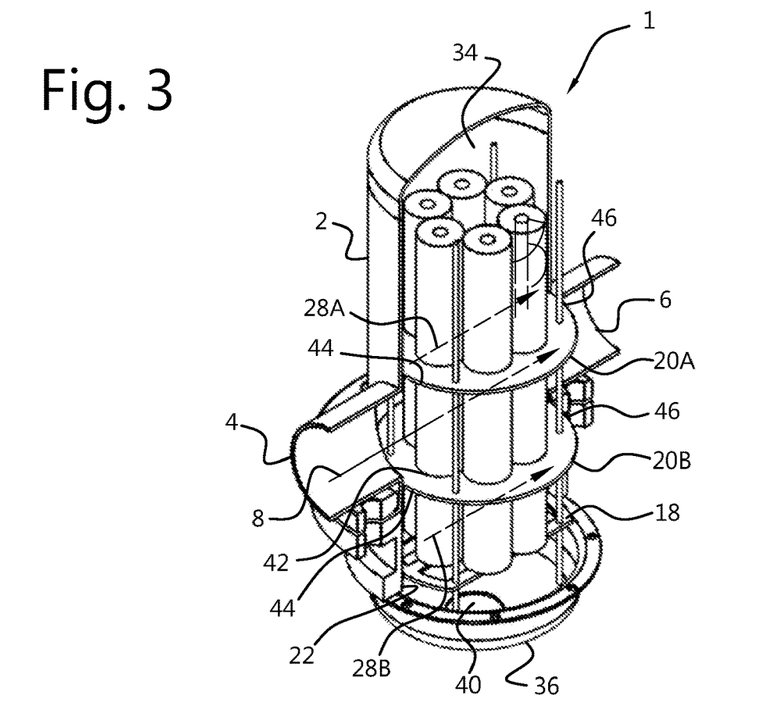
FIG. 3 shows an example of a cross section of a separator.

FIG. 3 shows an example of a cross section of a separator 1 for separating gas bubbles and/or particles from a liquid. For conciseness, only the differences with the example of FIG. 2 will be explained here.

In this example, the separating elements 10 are placed on the carrier 18. No plates are positioned below the carrier 18. In this example, the drain 40 is visible.

In FIG. 3, a first plate 20A is positioned above the fluid inlet 4 and fluid outlet 6. A second plate 20B is positioned below the fluid inlet 4 and fluid outlet 6. In this example, the separating elements 10 extend through apertures 42 in the plates 20A, 20B. The plates 20A, 20B have a shape and size that is complementary to the shape and size of the inner wall 22 of the collection chamber 2 at the location of the plates 20A, 20B. In this example, the entrance 44 of the second fluid flow paths 28A, 28B is formed by the gap between the perimeter of the plates 20A, 20B, and the inner wall 22 of the collection chamber 2 at the location of the plates 20A, 20B. In this example, the exit 46 of the second fluid flow paths 28A, 28B is formed by the gap between the perimeter of the plates 20A, 20B, and the inner wall 22 of the collection chamber 2 at the location of the plates 20A, 20B. Here the gap is chosen to be so large enough to allow flow of liquid through the gap. In this example the gap is chosen to be between 2 to 10 mm wide.

The separator as described in view of FIG. 3 can be operated as follows. A flow of liquid is fed into the fluid inlet 4. A first portion of the liquid flow will flow along the first fluid flow path 8 towards the fluid outlet 6. Along the first fluid flow path, the liquid encounters the separating elements 10.

A second portion of the liquid flow will flow from the fluid inlet 4 upwards along the inner wall 22 of the chamber 2 through the gap to above the first plate 20A and downwards to below the second plate 20B. There, the second portion of the liquid will flow along the two second flow paths 28A, 28B. It will be appreciated that the second portion of the liquid flow bypasses at least a portion of the separating elements 10. The second fluid flow paths 28A, 28B pacify the flow of liquid therethrough. This aids in generating gas bubbles and separating particles from the liquid flow. The gas bubbles will rise towards the head 34. The particles will sink towards the bottom 36.

In this example, a flow resistance of the second fluid flow path is higher than a flow resistance of the first fluid flow path. Hence, in this example the second portion of the liquid flow is smaller than the first portion of the liquid flow.

Figure 4:
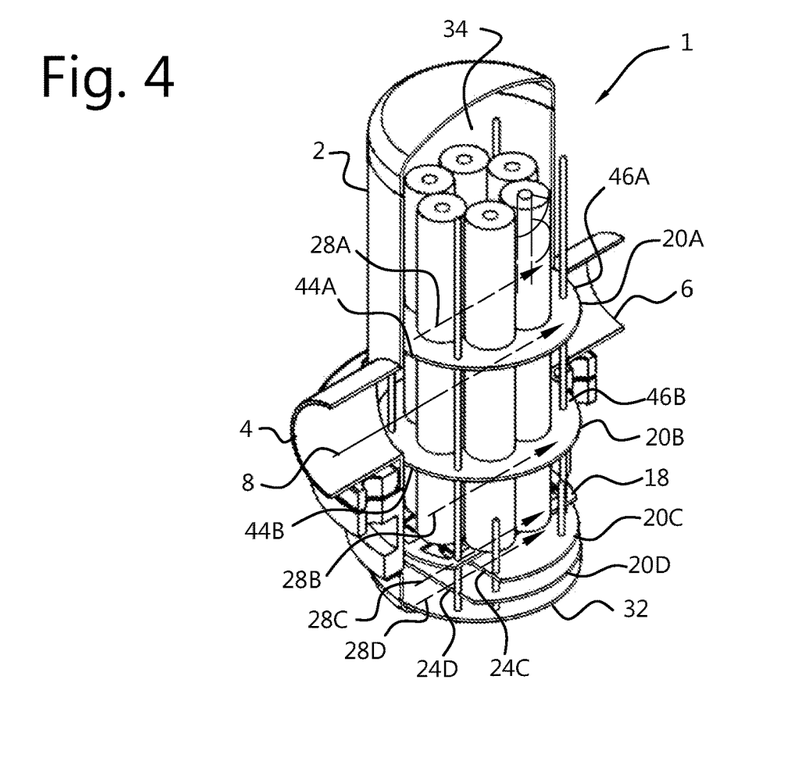
FIG. 4 shows an example of a cross section of a separator.

FIG. 4 shows an example of a cross section of a separator 1 for separating gas bubbles and/or particles from a liquid. For conciseness, only the differences with the examples of FIGS. 2 and 3 will be explained here.

In this example, the separating elements 10 are placed on the carrier 18. Two plates 20 are positioned below the carrier 18.

In FIG. 4, a first plate 20A is positioned above the fluid inlet 4 and fluid outlet 6. A second plate 20B is positioned below the fluid inlet 4 and fluid outlet 6. In this example, the separating elements 10 extend through apertures 42 in the plates 20A, 20B. The plates 20A, 20B have a shape and size that is complementary to the shape and size of the inner wall 22 of the collection chamber 2 at the location of the plates 20A, 20B.

In this example, the entrance 44A of a first second fluid flow paths 28A is formed by the gap between the perimeter of the plate 20A, and the inner wall 22 of the collection chamber 2 at the location of the plate 20A. In this example, the exit 46A of the first second fluid flow paths 28A is formed by the gap between the perimeter of the plate 20A, and the inner wall 22 of the collection chamber 2 at the location of the plate 20A. Here the gap is chosen to be so large enough to allow flow of liquid through the gap. In this example the gap is chosen to be between 2 to 10 mm wide.

In this example, two additional plates 20C, 20D are positioned below the carrier 18. An internal bottom 32 is positioned below the lower plate 20D. Thus, additional second fluid flow paths 28B, 28C, 28D are formed between the second plate 20B and the third plate 20C, between the third plate 20C and the fourth plate 20D, and between the fourth plate 20D and the internal bottom 32. The entrance 44B and exit 46B to/from the second fluid flow paths 28A, 28B, 28C is formed by the gap between the perimeter of the second plate 20B, and the inner wall 22 of the collection chamber 2 at the location of the second plate 20B. The entrance to the third second fluid flow path 28C is formed by cutout 24C. The entrance to the fourth second fluid flow path 28D is formed by cutout 24D.

The separator as described in view of FIG. 4 can be operated as follows. A flow of liquid is fed into the fluid inlet 4. A first portion of the liquid flow will flow along the first fluid flow path 8 towards the fluid outlet 6. Along the first fluid flow path, the liquid encounters the separating elements 10.

A second portion of the liquid flow will flow from the fluid inlet 4 upwards along the inner wall 22 of the chamber 2 through the gap to above the first plate 20A and downwards to below the second plate 20B. There, the second portion of the liquid will flow along the two second flow paths 28A, 28B, respectively. A portion of the liquid flowing in the second second flow path 28B will flow downwards towards the cutouts 24C, 24D. There, the a portion of the second portion of the liquid flow will be divided over the third and fourth second flow paths 28C, 28D, and flows along the plates 20C, 20D. It will be appreciated that the second portion of the liquid flow bypasses at least a portion of the separating elements 10. The second fluid flow paths 28A, 28B, 28C, 28D pacify the flow of liquid therethrough. This aids in generating gas bubbles and separating particles from the liquid flow. The gas bubbles will rise towards the head 34. The particles will sink towards the bottom 36.

In this example, a flow resistance of the second fluid flow paths is higher than a flow resistance of the first fluid flow path. Hence, in this example the second portion of the liquid flow is smaller than the first portion of the liquid flow.

Figure 5:
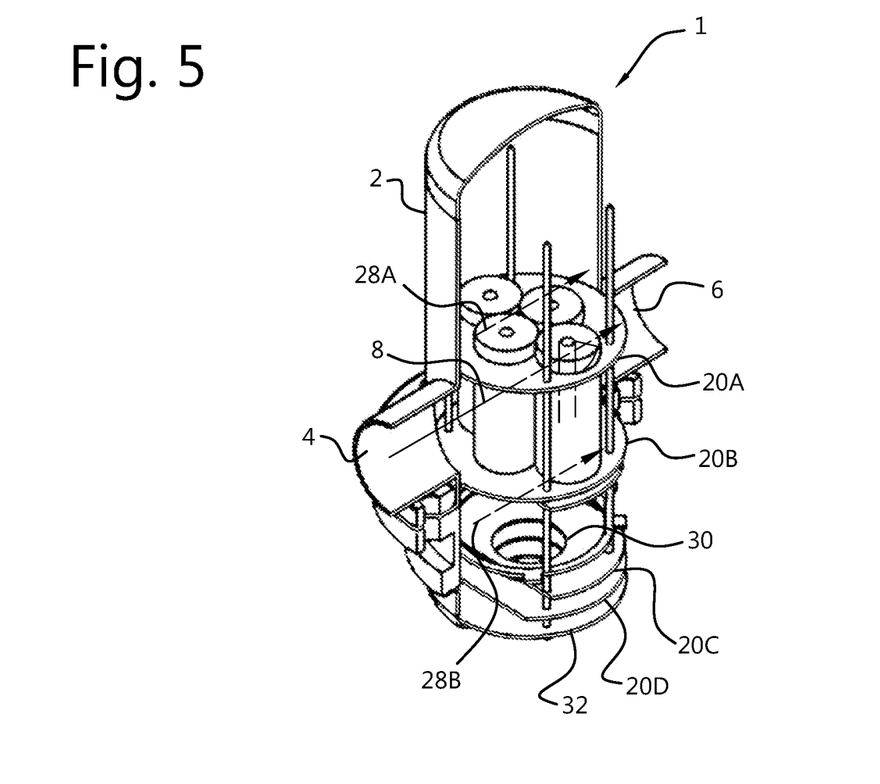
FIG. 5 shows an example of a cross section of a separator.

FIG. 5 shows an example of a cross section of a separator 1 for separating gas bubbles and/or particles from a liquid. For conciseness, only the differences with the examples of FIGS. 2, 3 and 4 will be explained here.

It will be appreciated that the separator 1 of FIG. 5 is highly similar to the separator of FIG. 4. The main difference is formed by the fact that in the separator of FIG. 5 the separating elements 10 only extend through the plates 20A, 20B over a short distance. Hence, there is less presence of the separating elements 10 in the first and second second fluid flow paths 28A, 28B.

Table 1 shows a comparison of experimental data of particle collection of the separators as shown in FIGS. 1-5. In each experiment 300 g of sand particles was added to a closed liquid flow circuit. In each experiment the particles were subsequently collected using one of the separators of FIGS. 1-5.

TABLE 1

| | Separator of: | | | | |
|---|---|---|---|---|---|
| | FIG. 1 | FIG. 2 | FIG. 3 | FIG. 4 | FIG. 5 |
| Number of separating elements | 6 | 6 | 6 | 6 | 4 |
| Length of separating elements | 400 mm | 400 mm | 400 mm | 400 mm | 170 mm |
| Particles collected | 182.5 g in 24 h | 252.5 g in 19 h | 230.9 g in 24 h | 239.9 g in 19 h | 241.3 g in 19 h |

As can be seen from table 1, the provision of the plates considerably improves the capability of the separator to collect particles, relative to the separator without plates as shown in FIG. 1.

In the examples of FIGS. 2-5 the plates are substantially flat. It is, however, also possible that the plates are non-flat. The plates can e.g. include a downward inclined portion and/or an upward inclined portion.

Figure 6A:
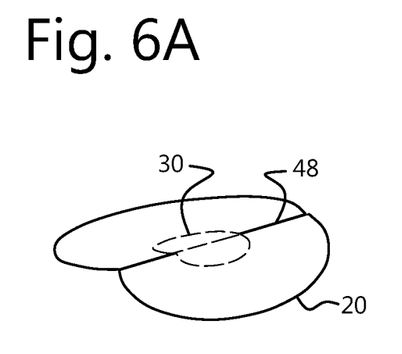
FIG. 6A shows an example of a plate.

FIG. 6A shows an example of a plate 20 being convex when viewed from above. In this example, the plate has a fold line 48. The fold line may extend in a direction of the second fluid flow path. Alternatively, the fold line may extend in a direction at an angle to the fluid flow path, e.g. perpendicular to the fluid flow path. Optionally, the plate may include the hole 30 for allowing gas bubbles to rise easily.

Figure 6B:
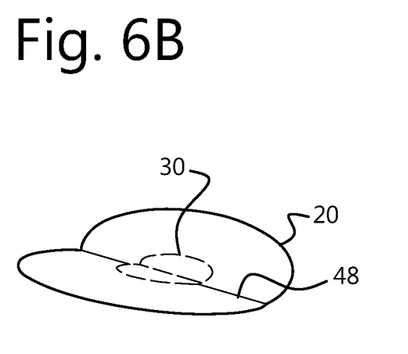
FIG. 6B shows an example of a plate.

FIG. 6B shows an example of a plate 20 being concave when viewed from above. In this example, the plate has a fold line 48. The fold line may extend in a direction of the second fluid flow path. Alternatively, the fold line may extend in a direction at an angle to the fluid flow path, e.g. perpendicular to the fluid flow path. Optionally, the plate may include the hole 30 for allowing particles to sink easily.

Instead of being concave or convex along a line, the plate can also be concave or convex relative to a point, such as the center of the plate. The plate can e.g. be a shallow cone, such as a dish, either convex or concave when viewed from above.

In the examples of FIGS. 2-5 the plates are substantially horizontal. It is, however, also possible that the plates are non-horizontal. The plates can e.g. be inclined. The incli-nation of the plate can allow gas bubbles to rise at the upper end of the plate and/or particles to sink at the lower end of the plate. The gas bubbles and/or particles can e.g. escape via the gap.

Figure 7A:
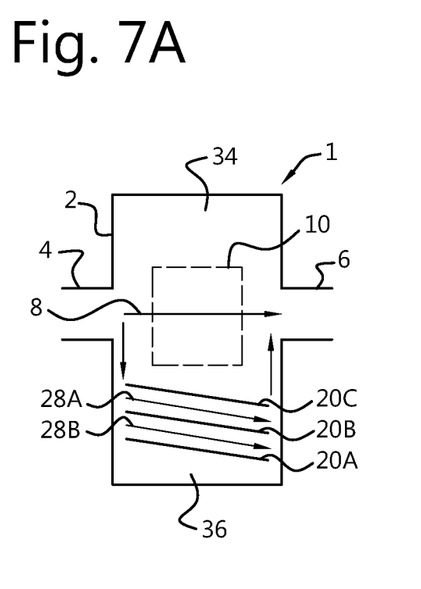
FIG. 7A shows an example of a cross section of a separator.

FIG. 7A shows an example wherein the plates are inclined in a direction of the second fluid flow path. In FIG. 7A the plates are inclined downwards in the flow direction. It is also possible that the plates are inclined upwards in the flow direction.

Figure 7B:
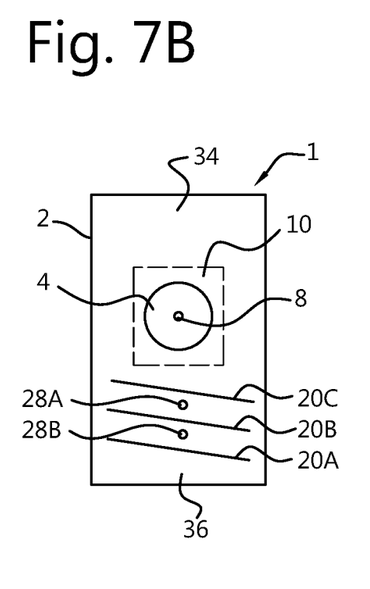
FIG. 7B shows an example of a cross section of a separator.

FIG. 7B shows an example wherein the plates are inclined in a direction perpendicular to the second fluid flow path.

Figure 8:
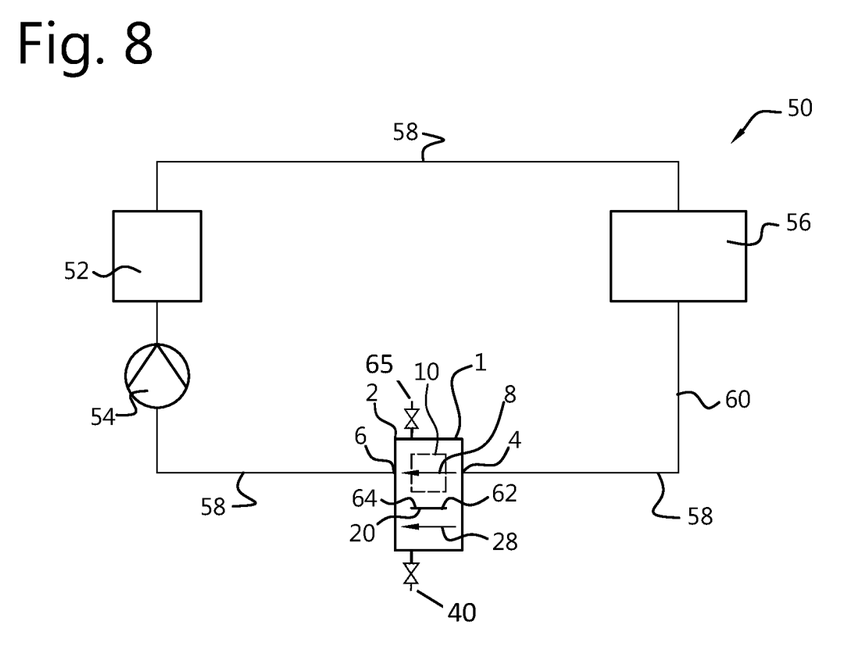
FIG. 8 shows a schematic representation of an example of a heating and/or cooling system.

FIG. 8 shows an example of a heating system 50. The heating system 50 includes a heater 52, a pump 54, and a radiator 56. Piping 58 connects the heater 52, pump 54, radiator 56 in a closed liquid circuit 60. The closed liquid circuit also includes a separator 1. The separator can be as described with respect to any of the FIGS. 2-7B.

In the example of FIG. 8 the separator 1 is included in the main flow path of the closed circuit 60. It will be appreciated that it is also possible that the separator is included in a parallel branch of the closed circuit 60.

In the example of FIG. 8 the separator 1 is part of a heating system 50. It will be appreciated that the separator 1 can also be part of a cooling system. The cooling system can include a cooling device a pump and a heat exchanger. The cooling device can replace the heater 52 in FIG. 8. The heat exchanger can replace the radiator 56 in FIG. 8.

The pump 54 causes a pressure difference across the separator 1. A liquid pressure at the fluid inlet 4 is higher than at the fluid outlet 6. The at least one plate 20 arranged in the collection chamber 2 has an upstream end 62 towards the fluid inlet 4 and a downstream end 64 towards the fluid outlet 6. The plate 20 is positioned such that in use a liquid pressure at the upstream end 62 is higher than the liquid pressure at the downstream end 64. The pressure difference at the upstream and downstream ends of the plate can be in the range of 0.01 to 0.3 bar, preferably 0.01 to 0.1 bar.

Herein, the invention is described with reference to specific examples of embodiments of the invention. It will, however, be evident that various modifications, variations, alternatives and changes may be made therein, without departing from the essence of the invention.

In the example of FIGS. 3, 4, and 5 at least one plate is positioned above the first fluid flow path and at least one plate is positioned below the first fluid flow path. In the example of FIG. 2 the plates are positioned below the first fluid flow path. It will be appreciated that it is also possible to provide the separator with the plates positioned above the first fluid flow path. However, other variations are possible.

For the purpose of clarity and a concise description features are described herein as part of the same or separate embodiments, however, alternative embodiments having combinations of all or some of the features described in these separate embodiments are also envisaged. Such alternative embodiments can also be understood to fall within the framework of the invention as outlined by the claims. The specifications, figures and examples are, accordingly, to be regarded in an illustrative sense rather than in a restrictive sense. The invention is intended to embrace all alternatives, modifications and variations which fall within the spirit and scope of the appended claims. Further, many of the elements that are described are functional entities that may be implemented as discrete or distributed components or in conjunction with other components, in any suitable combination and location.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A separator for separating gas bubbles and/or particles from a liquid, comprising a collection chamber having a substantially upright tubular side wall, a top and a bottom, a fluid inlet in the upright tubular side wall, a fluid outlet in the upright tubular side wall, and a first fluid flow path extending from the fluid inlet through the collection chamber to the fluid outlet;
   at least one separating element arranged in the collection chamber for separating gas bubbles and/or particles from the liquid, wherein the separating element is arranged in the first fluid flow path in between the fluid inlet and the fluid outlet;
   at least one plate arranged in the collection chamber underneath the at least one separating element at a vertical distance from the fluid inlet and the fluid outlet such that the at least one plate bounds a second fluid flow path extending underneath and along the at least one plate at least partially bypassing the separating element;
   a drain in the bottom of the collection chamber for draining particles from the separator; and
   a vent in the top of the collection chamber for venting gas from the separator.

2. The separator according to claim 1, wherein the at least one plate extends substantially parallel to the first fluid flow path.

3. The separator according to claim 1, wherein a flow resistance of the second fluid flow path is higher than a flow resistance of the first fluid flow path.

4. The separator according to claim 1, wherein the at least one plate includes a first cutout forming an entrance of the second fluid flow path, and a second cutout forming an exit of the second fluid flow path.

5. The separator according to claim 1, wherein the at least one plate is arranged in a lying position.

6. The separator according to claim 1, wherein a plurality of plates are arranged in the collection chamber such that each plate defines a passage forming the second fluid flow path underneath that plate at least partially bypassing the separating element.

7. The separator according to claim 6, wherein the plurality of plates are arranged mutually parallel.

8. The separator according to claim 7, wherein a length of the plates in a direction of the second flow path is larger than a distance between a pair of adjacent plates.

9. The separator according to claim 1, wherein the at least one plate is at least partially inclined.

10. The separator according to claim 1, wherein the separating element includes a core tube and a wire structure attached to the core tube.

11. The separator according to claim 1, wherein at least one separating element extends through an opening formed in the at least one plate.

12. A heating or cooling system including a liquid flow circuit, the liquid flow circuit including a pump and the separator according to claim 1, wherein in use the pump causes a pressure difference across the separator, such that a liquid pressure at the fluid inlet is higher than at the fluid outlet.

13. The heating or cooling system according to claim 12, wherein the at least one plate arranged in the collection chamber has an upstream end towards the fluid inlet and a downstream end towards the fluid outlet, wherein the plate is positioned such that in use a liquid pressure at the upstream end is higher than a liquid pressure at the downstream end.

14. A method for separating gas bubbles and/or particles from a liquid using the separator according to claim 1, the method comprising the steps of feeding a liquid flow to the fluid inlet, and draining liquid from the fluid outlet.

* * * * *